(12) United States Patent
Zhang

(10) Patent No.: US 7,885,881 B2
(45) Date of Patent: *Feb. 8, 2011

(54) SYSTEM AND METHOD FOR BANKING MARKET ANALYSIS

(75) Inventor: Yunlei Zhang, Edison, NJ (US)

(73) Assignee: Morgan Stanley, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/726,417

(22) Filed: Mar. 18, 2010

(65) Prior Publication Data

US 2010/0174588 A1 Jul. 8, 2010

Related U.S. Application Data

(62) Division of application No. 10/835,811, filed on Apr. 30, 2004, now Pat. No. 7,689,486.

(51) Int. Cl.
*G06Q 40/00* (2006.01)

(52) U.S. Cl. ....................................... 705/35
(58) Field of Classification Search ............. 705/35
See application file for complete search history.

(56) References Cited

U.S. PATENT DOCUMENTS 5,570,291 A    10/1996  Dudle et al.
6,052,672 A    4/2000   Foster
7,689,486 B2   3/2010   Zhang
2004/0138998 A1 7/2004  Lawrence

OTHER PUBLICATIONS

Davies, et al., The New Penguin Business Dictionary, 2003.

*Primary Examiner*—Kirsten S Apple
*Assistant Examiner*—Scott S Trotter
(74) *Attorney, Agent, or Firm*—K&L Gates LLP

(57) ABSTRACT

System and method of estimating a wallet share for one or more advisors for investment banking deals involving equity-related products that occurred during an evaluation time period. Method may comprising determining a fee estimate for the one or more advisors for the deals involving equity-related products during the evaluation time period, wherein the fee estimate for the one or more advisors for each deal is determined based on one or more look-up tables specific to the type of equity-related product and the geographic region for the deal, and wherein the one or more look-up tables indicate a fee estimate for the one or more advisors based on the deal size, the number of advisors, and the role of the one or more advisors. Method may also comprise determining a wallet share for the one or more advisors over the evaluation time period based on an aggregation of the fee estimates for the one or more advisors during the evaluation time period.

14 Claims, 8 Drawing Sheets

| DEAL SIZE | SOLE ADVISOR FEE | MULTIPLE ADVISOR FEE |
|---|---|---|
| $100 - $500M | AA% | GG% |
| $500M - $1B | BB% | HH% |
| $1B - $5B | CC% | II% |
| $5B - $10B | DD% | JJ% |
| $10B - $25B | EE% | KK% |
| > $25B | FF% | LL% |

M&A WALLET SHARE BY DEAL SIZE & BY ADVISOR

| YEAR | DEAL SIZE | STREET WALLET | BANK 1 | BANK 2 | BANK 3 | BANK 4 | BANK 5 | BANK 6 |
|---|---|---|---|---|---|---|---|---|
| 2003 | 5bn+ | 17,389 | 8.6% | 16.7% | 6.3% | 2.9% | 7.8% | 7.7% |
| 2003 | 2-5bn | 13,916 | 7.1% | 12.0% | 10.7% | 6.5% | 6.3% | 7.4% |
| 2003 | .5-2bn | 40,442 | 9.8% | 10.8% | 6.2% | 8.1% | 7.4% | 7.7% |
| 2003 | .5-bn | 46,991 | 7.9% | 9.3% | 5.2% | 9.4% | 8.3% | 9.9% |
| 2004 | 5bn+ | 13,567 | 9.6% | 12.3% | 7.5% | 0.0% | 8.3% | 12.3% |
| 2004 | 2-5bn | 4,558 | 9.9% | 18.2% | 3.7% | 5.4% | 5.3% | 7.5% |
| 2004 | .5-2bn | 14,643 | 9.5% | 9.8% | 3.9% | 6.4% | 11.2% | 9.1% |
| 2004 | .5-bn | 15,069 | 8.6% | 10.9% | 6.2% | 9.5% | 6.2% | 8.6% |

| DEAL SIZE | SOLE BOOK RUNNER FEE | MULTIPLE BOOK RUNNER FEE |
|---|---|---|
| > $100M | AA% | GG% |
| $100M - $250M | BB% | HH% |
| $250M - $500M | CC% | II% |
| $500M - $1B | DD% | JJ% |
| > $1B | EE% | LL% |

IPO WALLET SHARE BY DEAL SIZE & BY ADVISOR

| YEAR | DEAL SIZE | STREET WALLET | BANK 1 | BANK 2 | BANK 3 | BANK 4 | BANK 5 | BANK 6 |
|---|---|---|---|---|---|---|---|---|
| 2003 | <$100MM | 17,389 | 8.6% | 16.7% | 6.3% | 2.9% | 7.8% | 7.7% |
| 2003 | $100 - 250MM | 13,916 | 7.1% | 12.0% | 10.7% | 6.5% | 6.3% | 7.4% |
| 2003 | $250 - 500MM | 40,442 | 9.8% | 10.8% | 6.2% | 8.1% | 7.4% | 7.7% |
| 2003 | $500MM - $1Bn | 46,991 | 7.9% | 9.3% | 5.2% | 9.4% | 8.3% | 9.9% |
| 2003 | >$1Bn | 38,695 | 7.4% | 10.1% | 6.1% | 7.9% | 5.8% | 8.0% |
| 2004 | <$100MM | 13,567 | 9.6% | 12.3% | 7.5% | 0.0% | 8.3% | 12.3% |
| 2004 | $100 - 250MM | 4,558 | 9.9% | 18.2% | 3.7% | 5.4% | 5.3% | 7.5% |
| 2004 | $250MM - 500MM | 14,643 | 9.5% | 9.8% | 3.9% | 6.4% | 11.2% | 9.1% |
| 2004 | $500MM - $1Bn | 12,250 | 9.1% | 10.4% | 3.8% | 7.2% | 10.5% | 8.9% |
| 2004 | >$1Bn | 15,069 | 8.6% | 10.9% | 6.2% | 9.5% | 6.2% | 8.6% |

*FIG. 7*

| MATURITY DATE | DOLLAR GLOBAL BONDS | DOLLAR NON-GLOBAL BONDS | RETAIL INSURANCES |
|---|---|---|---|
| 18 MOS - 2 YRS | A1% | B1% | C1% |
| 3 - 5 YRS | A2% | B2% | C2% |
| 5 - 6 YRS | A3% | B3% | C3% |
| 7 - 10 YRS | A4% | B4% | C4% |
| 11 - 15 YRS | A5% | B5% | C5% |
| 15 - 30 YRS | A6% | B6% | C6% |
| > 30 YRS | A7% | B7% | C7% |

*FIG. 9*

| MATURITY DATE | AAA | AA | A | BBB+ | BBB | BBB- |
|---|---|---|---|---|---|---|
| 3 - 5 YRS | A1% | B1% | C1% | D1% | E1% | F1% |
| 5 - 6 YRS | A2% | B2% | C2% | D2% | E2% | F2% |
| 7 - 10 YRS | A3% | B3% | C3% | D3% | E3% | F3% |
| 11 - 15 YRS | A4% | B4% | C4% | D4% | E4% | F4% |
| 15 - 30 YRS | A5% | B5% | C5% | D5% | E5% | F5% |
| > 30 YRS | A6% | B6% | C6% | D6% | E6% | F6% |

*FIG. 10*

| BOOK RUNNERS | | |
|---|---|---|
| DEAL SIZE | YEAR 1 | YEAR 2 |
| LARGE | A1% | B1% |
| MEDIUM | A2% | B2% |
| SMALL | A3% | B3% |

| NON-BOOK RUNNERS | | |
|---|---|---|
| DEAL SIZE | YEAR 1 | YEAR 2 |
| LARGE | C1% | D1% |
| MEDIUM | C2% | D2% |
| SMALL | C3% | D3% |

SYSTEM AND METHOD FOR BANKING MARKET ANALYSIS

PRIORITY CLAIM

The present application is a divisional of copending U.S. patent application Ser. No. 10/835,811, filed Apr. 30, 2004, which is incorporated herein by reference in its entirety.

BACKGROUND

The present invention generally concerns investment banking deals and transactions and, more particularly, estimating fees for advisors for such deals and transactions.

Investment banks perform a variety of services for their clients. One common role that investment banks assume is to help companies and governments issue securities, such as equity securities (e.g., stocks) or debt securities (e.g., bonds). Further, a number of investment banks may act together as a "syndicate" to jointly assist in issuing the securities. Each investment bank that is part of the syndicate may perform a different role or share a particular role with other investment banks. The fee an investment bank earns from a deal typically depends on its role in the deal and the size of the deal.

The different advisory roles in a syndicate that an investment bank may assume for a particular deal involving the issue of new securities typically include the book runner, the lead manager, the co-lead manager and the co-manager. The book runner typically acts as the managing underwriter for the new issue. In that regard, the book runner typically maintains the book of securities sold. Also, the book runner is primarily responsible for marketing the new issue to prospective buyers. The lead manager comprises the second tier of the syndication. The responsibilities of the lead manager are similar to the book runner, but to a lesser degree. The co-lead manager shares the lead managing responsibilities with the lead manager, but to a lesser degree. Finally, the co-managers have the least management responsibility in a deal. Also, one or more investment banks may share the same role. That is, for example, a particular deal may have two book runners. Typically, the book runners receive the highest fee from a deal, followed by the lead manager, then the co-lead manager(s), and then the co-manager(s).

Another service that investment bankers often perform is to act as an advisor on mergers and acquisitions (M&As). A particular merger or acquisition deal may have one or a number of advisors. If there is one advisor, that sole advisor earns the entire fee for the deal. If there are multiple advisors, those advisors split the fee.

SUMMARY

In one general aspect, the present invention is directed to a method of estimating a fee earned by one or more advisors from an investment banking deal. The investment banking deal may be, for example, a merger or acquisition, an initial public offering, an offering of convertible securities, a secondary offering, a block trade of securities, an offering of investment-grade debt securities and/or an offering of high-yield securities. The advisors may be, for example, investment banks performing one of the roles of the various tiers of a syndicate, such as book runner, lead manager, co-lead manager, or co-manager for financing deals, or advisors for merger & acquisition deals.

According to various embodiments, the method includes retrieving data regarding the investment banking deal or deals of interest. The data may include an identification of the one or more advisors, the role of the one or more advisors, and a parameter of the deal, such as the size of the deal, the geographic region or country for the deal, and the credit rating and/or the maturity date when the deal involves the issuance of debt securities. The method further includes determining a fee estimate for each of the one or more advisors based on a look-up table that includes a fee estimate based on the parameter of the deal and the role of the advisor.

In various implementations, the method may further comprise retrieving data regarding a plurality of such deals and determining the fee estimate for each of the one or more advisors for each of the plurality of offerings, and then aggregating the fee estimates by product, by client, by sector and/or and by region to determine market trend information.

In another general respect, embodiments of the present invention are directed to a method of displaying market trend information in the investment banking industry. According to various embodiments, the method comprises, for each of at least two investment banks, plotting a marker at a coordinate on a grid including two dimensions. A first axis of the grid may correspond to the wallet share of the investment bank over a period of time, and a second axis may correspond to the number of clients serviced by the investment bank over the period of time. In addition, a parameter of each marker (such as the radius of a circle when the marker is a circle) may be related to the wallet of the associated investment bank over the time period.

In another general aspect, embodiments of the present invention are directed to systems and methods of estimating a wallet share for one or more advisors for investment banking deals involving equity-related products that occurred during an evaluation time period. According to various embodiments, the method may comprise the step of storing, in a database of a computer system, data regarding the deals involving equity-related products during the evaluation time period. The stored data may include an identification of the one or more advisors for each of the deals involving equity-related products during the evaluation time period, a role of the one or more advisors in the deals involving equity-related products during the evaluation time period, and a plurality of parameters for the deals involving equity-related products. The plurality of parameters may comprise: (i) a type of equity-related product; (ii) a geographic region for the deal; and (iii) a deal size for the deal. The method may also comprise determining, by the computer system, a fee estimate for the one or more advisors for the deals involving equity-related products during the evaluation time period. The fee estimate for the one or more advisors for each deal may be determined based on one or more look-up tables specific to the type of equity-related product and the geographic region for the deal. The one or more look-up tables may indicate a fee estimate for the one or more advisors based on the deal size, the number of advisors, and the role of the one or more advisors. The method may also comprise determining, by the computer system, a wallet share for the one or more advisors over the evaluation time period based on an aggregation of the fee estimates for the one or more advisors during the evaluation time period.

DESCRIPTION OF THE FIGURES

Embodiments of the present invention will be described by way of example in conjunction with the following figures, wherein:

FIG. 7 is a sample chart of aggregated fee information for an equity product deal;

FIGS. 9 and 10 are sample fee look-up tables for the investment-grade debt fee calculation module;

DESCRIPTION

Figure 1:
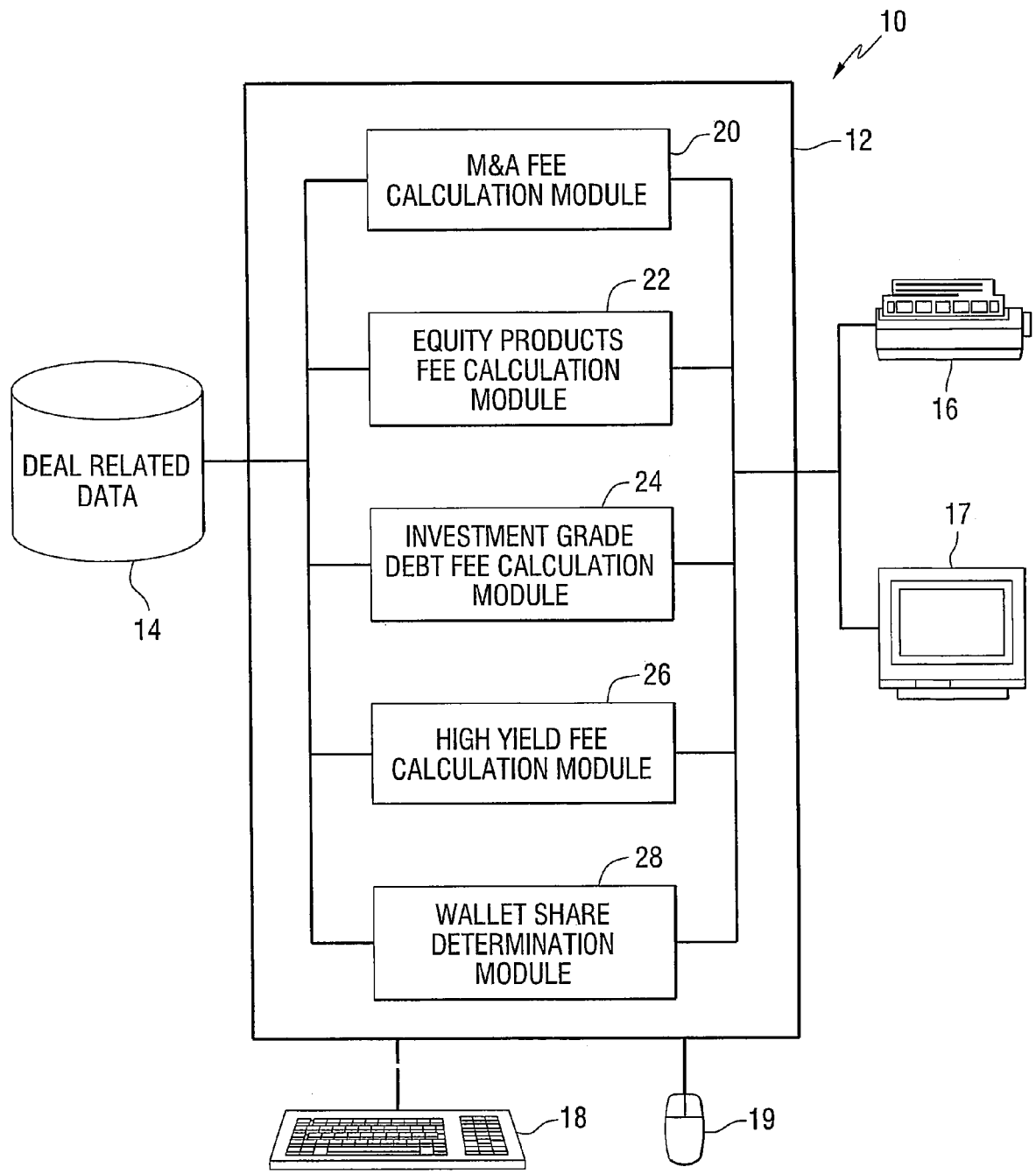
FIG. 1 is a diagram of a system according to various embodiments of the present invention.

FIG. 1 is a diagram of a system 10 for estimating fees and analyzing market trends in the investment banking industry. The system 10 includes a computing device 12 in communication with one or more databases 14 and one or more output devices, such as a printer 16 or a monitor 17. The system 10 may also include data input devices, such as a keyboard 18 and a mouse 19, that permit a user of the system 10 to input data or programs. Also, a user may be remotely located from the system 10, in which case user instructions and data may be communicated to the system 10 via any type of suitable network communication technique or protocol.

The computing device 12 may include, as illustrated in FIG. 1, an M&A fee calculation module 20, an equity products fee calculation module 22, an investment-grade debt fee calculation module 24, a high yield fee calculation module 26, and a wallet share determination module 28. The modules 20-28 may be implemented as software code to be executed by a processor (not shown) of the computing device 12 using any suitable computer language, such as, for example, SAS, Java, C, C++, or Perl using, for example, conventional or object-oriented techniques. The software code may be stored as a series of instructions or commands on a computer-readable medium, such as a random access memory (RAM), a read-only memory (ROM), a magnetic medium such as a hard drive or a floppy disk, or an optical medium, such as a CD-ROM. The computing device 12 may be implemented as one or a number of networked computing devices, such as personal computers, laptops, workstations, servers, etc. The database(s) 14 may contain data regarding investment banking deals, as described in more detail below. Output from the modules 20-26 may be communicated to the output devices for display.

The M&A fee calculation module 20 may estimate the fees earned by investment banks in advisor roles for M&A deals based on information about M&A deals stored in the database 14. The M&A deal data may include the investment banks involved in the deal, the location (e.g., country) of the deal, the number of advisors and the size of the deal. Such data is available, for example, from Thomson Financial. From this information, the M&A fee calculation module 20, as explained below, may estimate the fee earned by each investment bank involved in the deal as an advisor. This analysis can be applied or the data can be aggregated to detect and analyze trends in the investment banking industry. The equity products fee calculation module 22 may do the same for equity-related product deals. Such equity-related product deals include, for example, initial public offerings (IPOs), secondary offerings, convertible security offerings and block trades of equity securities. Accordingly, the equity products fee calculation module 22 may estimate the fees earned by the investment banks performing roles in the various tiers (e.g., book runner, lead manager, co-lead manager, co-manager) of a syndicate for such deals. The investment-grade debt fee calculation module 24 may do the same for investment-grade debt deals and the high yield fee calculation module 26 may do the same for offerings of high-yield securities. The wallet share determination module 28 may determine wallet share-related information for advisors on such deals, such as investment banks, based on the fee data estimated by the module 20-26. The term "wallet share" in this sense refers to an advisor's (such as an investment bank's) percentage of street business from a product, a client, a sector, a region or country, etc. The wallet share determination module 28 may additionally aggregate and display such wallet share-related information.

Figures 2, 3, 4:
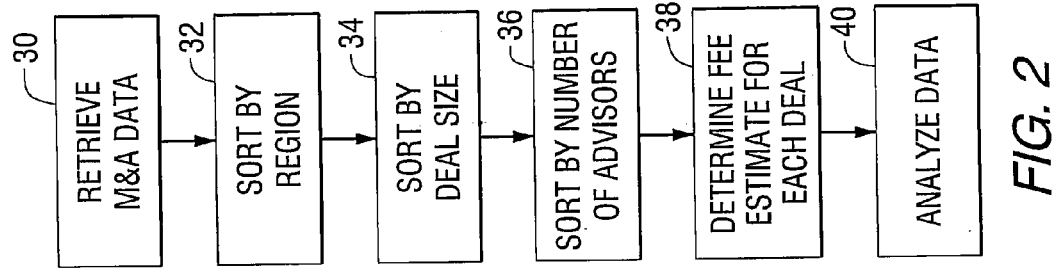
FIG. 2 is a flowchart of a process flow through the M&A fee calculation module of the system of FIG. 1 according to various embodiments of the present invention.
FIG. 3 is a sample fee look-up table for the M&A fee calculation module for a region or country.
FIG. 4 is a sample chart of aggregated fee information for M&A transactions.

FIG. 2 is a flowchart of the process flow through the M&A fee calculation module 20 according to various embodiments of the present invention. The process starts at step 30, where M&A deal information is retrieved from the database 14. As mentioned above, the M&A deal information may include, for example, the region or country of the deal (e.g., North America, Europe, Latin America, Asia, Germany, etc.), the size of the deal and the number of advisors. Next, at step 32, the M&A fee calculation module 20 may sort the deal data by deal region or country. Next, at step 34, the M&A fee calculation module 20 may sort the deal data by deal size. For example, the M&A fee calculation module 20 may sort the deal into a number of "buckets" grouped by deal size. For example, the M&A fee calculation module 20 may group deals into the following buckets:

| | |
|---|---|
| Bucket 1 | $100 M-$500 M |
| Bucket 2 | $500 M-$1 B |
| Bucket 3 | $1 B-$5 B |
| Bucket 4 | $5 B-$10 B |
| Bucket 5 | $10 B-$25 B |
| Bucket 6 | >$25 B |

Next, at step 36, the M&A fee calculation module 20 may sort the data based on the number of advisors for the M&A transaction. M&A transactions typically have a sole advisor or a number of advisors. Then, at step 38, the M&A fee calculation module 20 may estimate the fee for the advisor(s). The M&A fee calculation module 20 may use a look-up table to estimate the fee. FIG. 3 is a sample look-up table. The table can be specific to a particular region or country, such as North America, Europe, Germany, etc. As can be seen in FIG. 3, the M&A fee calculation module 20 may estimate that a sole advisor earns AA % of the deal size for deals having a size between $100M and $500M, earns BB % for deals between $500M and $1B, and so on. For deals between $100M and $500M, multiple advisors would share a fee of GG % of the deal size. In populating the table with the fee percentage values, a linearization algorithm may be applied between two consecutive size groups (e.g., buckets) to ensure that the estimated fee is a monotone function of the deal size.

The values of the look-up table may be based on data from previous M&A deals for which fee percentage allocations are known. For example, while an investment bank may not know the fee percentages for deals in which it does not play a role, it typically will have data on the fee arrangements for the deals in which it did participate. The values of the look-up table may be populated based on that data and any other reliable data the investment bank may have regarding fee allocations. In such cases, the value may be, for example, averages of the fee percentage over a certain time period, such as the previous two years, three years, five years, etc.

Referring back to FIG. 2, at step 40, the M&A fee calculation module 20 may aggregate the fee estimation data in order that it may be analyzed. The data may be aggregated in any number of ways to, for example, detect and/or analyze trends in fees, trends in wallet share among investment banks, etc. The particular manner in which the data is aggregated may be based on input from a user of the system 10, received, for example, via one of the input devices or any other mechanism for providing user instructions to the system 10. For example, referring to FIG. 4, the estimated M&A fee data may be aggregated to determine the wallet share for each investment bank by different M&A deal size over a particular time period. The output of the M&A fee calculation module 20, such as the chart of FIG. 4, may be communicated to one of the output devices for display.

Past M&A deal data may be used to analyze parameters that have a significant impact on the fee and, according to various embodiments, only those parameters may be selected to be used by the M&A fee calculation module 20 to sort the M&A deal data. That is, for example, only those parameters, such as region or country, deal size and number of advisors, shown to have a non-insignificant impact on the fee for M&A deals may be used.

Figures 5, 6:
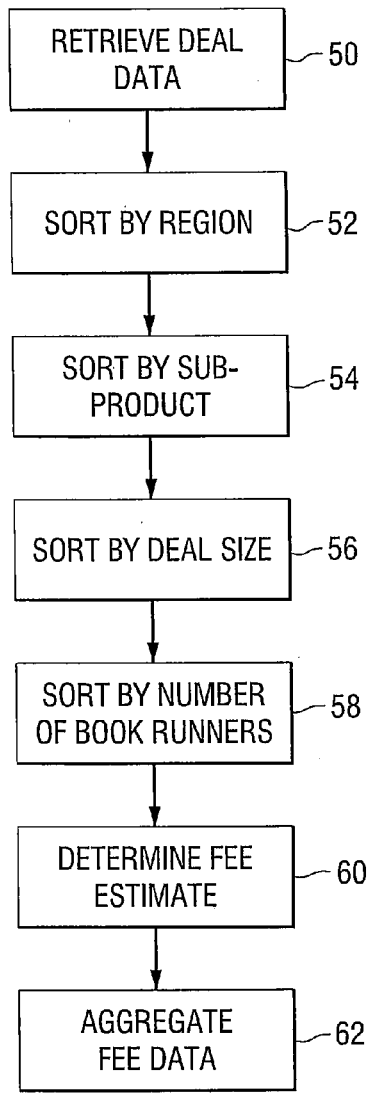
FIG. 5 is a flowchart of a process flow through the equity products fee calculation module of the system of FIG. 1 according to various embodiments of the present invention.
FIG. 6 is a sample fee look-up table for the equity products fee calculation module.

FIG. 5 is a flowchart of the process flow through the equity products fee calculation module 22 according to various embodiments of the present invention. The process starts at step 50, where the equity products fee calculation module 22 retrieves the relevant equity-product deal data from the database 14. At step 52, the equity products fee calculation module 22 may sort the data by region or country, such as U.S., international, etc. At step 54, the equity products fee calculation module 22 may sort the data by sub-product. The sub-products for equity-related products may be, for example, IPOs, offerings of convertible securities, secondary offerings and block trades of securities.

Next at step 56 the equity products fee calculation module 22 may sort the data by deal size. The deal size groupings, or buckets, for equity-related products may be, for example:

| Bucket 1 | <$100 M |
| Bucket 2 | $100 M-$250 M |
| Bucket 3 | $250 M-$500 M |
| Bucket 4 | $500 M-$1 B |
| Bucket 5 | >$1 B |

Next, at step 58, the deal data may be sorted by the number of book runners. Then, at step 60, the fee estimates for the syndicate may be determined. The equity products fee calculation module 22 may use a look-up table for each combination of region/sub-product to estimate the fee. FIG. 6 is a sample look-up table for the equity products fee calculation module 22 for a particular combination of region and sub-product. As before, the values of the look-up table may be populated based on data that may be available about the fee structures for various combinations of region and sub-product for equity-related products.

Equity-related product deals typically have a syndicate with about four tiers: book runner, lead manager, co-lead manager and co-manager. The fee percentages in the look-up table of FIG. 6 may represent the fee shared among the various tiers. The equity products fee calculation module 22 may utilize an additional look-up table (not shown) to estimate the fee allocation among the various tiers of the syndicate. Typically the book runner(s) gets the most, the lead manager the second most, the co-lead manager the third most, and the co-manager typically receives the smallest portion. Different sub-products may have different distributions among the tiers of the syndicate. For example, offerings of convertible securities typically allocate a higher percentage fee to book runners than other equity-related sub-products. Accordingly, the equity products fee calculation module 22 may utilize different fee allocation look-up tables dependent upon the sub-product.

As before, an analysis may be used to select the parameters by which the equity products fee calculation module 22 sorts the deal data. That is, for example, only those parameters, such as region, deal size, number of book runners and sub-product, shown to have a non-insignificant impact on the fee for equity-related product deals, may be used.

Referring back to FIG. 5, at step 62, the equity products fee calculation module 22 may aggregate the fee estimation data in order that it may be analyzed. The data may be aggregated in any number of ways to, for example, detect and/or analyze trends in fees, trends in wallet share among investment banks, etc. The particular manner in which the data is aggregated may be based on input from a user of the system 10, received, for example, via one of the input devices or any other mechanism for providing user instruction to the system 10. For example, referring to FIG. 7, the estimated fee data may be aggregated to determine wallet share for each investment bank by different deal size over a particular time period. The output of the equity products fee calculation module 22 may be communicated to one of the output devices for display.

Figure 8:
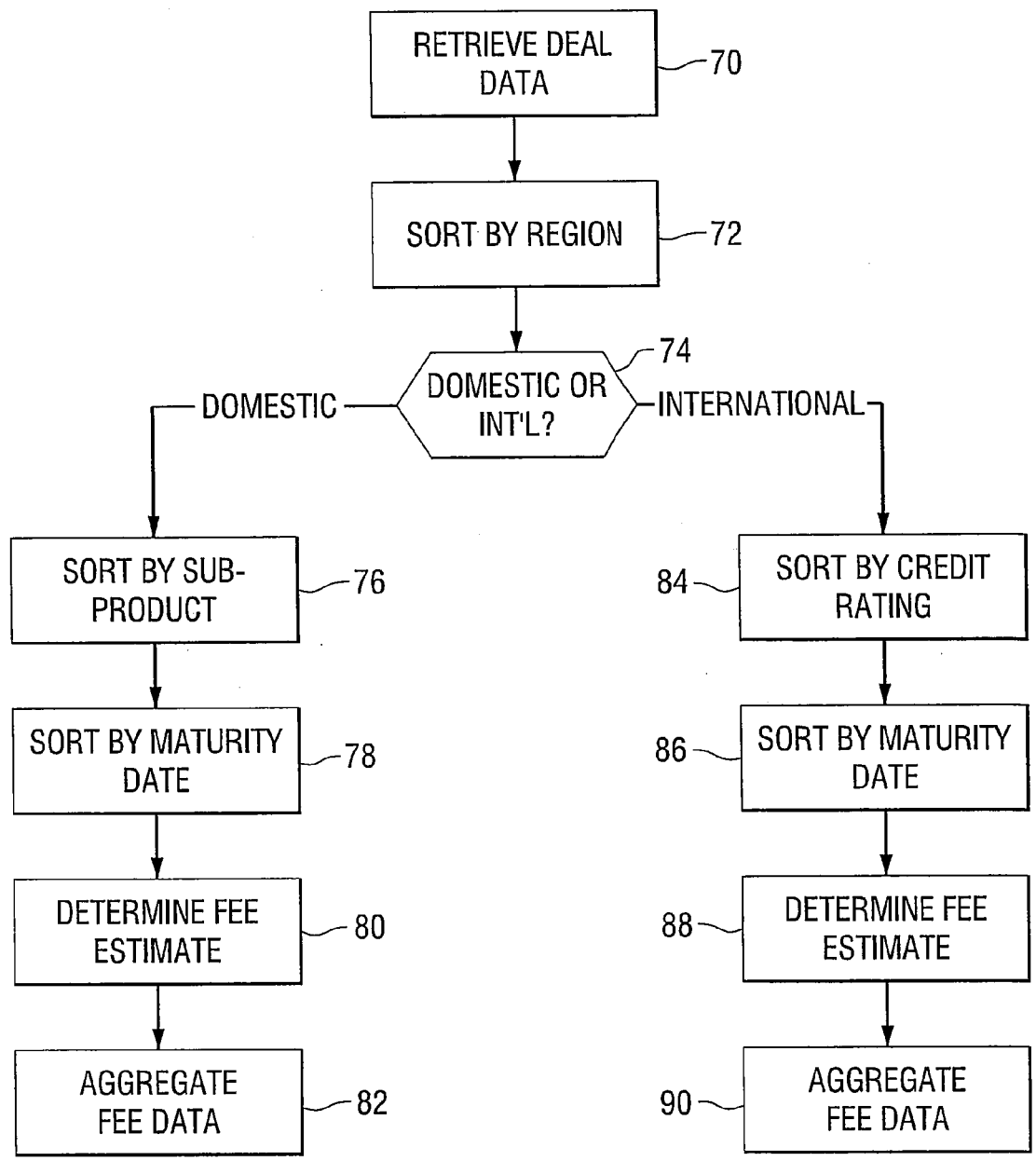
FIG. 8 is a flowchart of a process flow through the investment-grade debt fee calculation module of the system of FIG. 1 according to various embodiments of the present invention.

FIG. 8 is a flowchart of the process flow through the investment-grade debt fee calculation module 24 according to various embodiments of the present invention. The process starts at step 70, where the investment-grade debt fee calculation module 24 retrieves the relevant investment-grade debt deal data from the database 14. At step 72, the investment-grade debt fee calculation module 24 may sort the data by region, such as domestic or international. Because history has shown that the fees for the various tiers of the book running syndicate for investment-grade debt offerings are dependent upon different factors for domestic (U.S.) and international (non-U.S.) offerings, the fee estimates determined by the investment-grade debt fee calculation module 24 may be based on different factors for domestic and international offerings, respectively.

Thus, at decision step 74, if it is determined that the offerings are domestic, the process may advance to step 76, where the investment-grade debt fee calculation module 24 may sort the domestic investment-grade debt offering data by sub-product. The sub-products for investment-grade debt products may be, for example, dollar global bonds, dollar non-global bonds and retail issuances. Next, at step 78, the investment-grade debt fee calculation module 24 may sort the data by maturity date. The maturity date groupings, or buckets, for investment-grade debt products may be, for example:

| | |
|---|---|
| Bucket 1 | 18 mos-2 yrs |
| Bucket 2 | 3-5 yrs |
| Bucket 3 | 5-6 yrs |
| Bucket 4 | 7-10 yrs |
| Bucket 5 | 11-15 yrs |
| Bucket 6 | 15-30 yrs |
| Bucket 7 | >30 yrs |

Next, at step 80, the fee estimates for the syndicate may be determined. The investment-grade debt fee calculation module 24 may use a look-up table based on the sub-product to estimate the fee. FIG. 9 is a sample look-up table for the investment-grade debt fee calculation module 24 for a region (such as the U.S.) where a sub-product is a key factor in estimating the fee for investment-grade debt products. As before, the values of the look-up table may be populated based on data that may be available about the fee structures for various combinations of region and sub-product for investment-grade debt products.

At step 82, the investment-grade debt fee calculation module 24 may aggregate the fee estimation data in order that it may be analyzed. The data may be aggregated in any number of ways to, for example, detect and/or analyze trends in fees, trends in wallet share among investment banks by product, by client, by sector and by region, etc. The particular manner in which the data is aggregated may be based on input from a user of the system 10, received, for example, via one of the input devices or any other mechanism for providing user instruction to the system 10. The output of the investment-grade debt fee calculation module 24 may be communicated to one of the output devices for display.

Returning to step 74, if it is determined that the investment-grade debt offerings are international, the process may advance to step 84, where the investment-grade debt fee calculation module 24 may sort the international investment-grade debt offering data by credit rating. The credit rating groupings for investment-grade debt may be, for example, AAA, AA, A, BBB+, BBB and BBB−. Next, at step 86, the investment-grade debt fee calculation module 24 may sort the data by maturity date. The maturity date groupings, or buckets, for investment-grade debt products may be the same as for the offerings sorted by sub-product at step 78, or it may be different. For example, according to one embodiment, the maturity date groupings for international investment-grade debt offerings may be:

| | |
|---|---|
| Bucket 1 | 3-5 yrs |
| Bucket 2 | 5-6 yrs |
| Bucket 3 | 7-10 yrs |
| Bucket 4 | 11-15 yrs |
| Bucket 5 | 15-30 yrs |
| Bucket 6 | >30 yrs |

Next, at step 88, the fee estimates for the syndicate may be determined. The investment-grade debt fee calculation module 24 may use a look-up table based on the credit rating to estimate the fee for such offerings. FIG. 10 is a sample look-up table for the investment-grade debt fee calculation module 24 for a region (such as international offerings) where the credit rating is a key factor in estimating the fee for investment-grade debt products. As before, the values of the look-up table may be populated based on data that may be available about the fee structures for various combinations of region and credit ratings for investment-grade debt products. The roles of advisors for investment grade debt may be the same as for equity-related products. At step 90, the investment-grade debt fee calculation module 24 may aggregate the fee estimation data in order that it may be analyzed.

As mentioned above, the investment-grade debt fee calculation module 24 may use different look-up tables to estimate the advisor fees based on whether the offerings are domestic or international. This is because, as mentioned above, history has shown that investment-grade debt sub-product is a more significant fee differentiator for domestic offerings and that the credit rating is a more significant fee differentiator for international offerings. These determinations may be made, for example, based on an analysis of various factors impacting the advisor fees with different roles for investment-grade debt offerings. Moreover, the analysis may be performed periodically to assess whether the fee assumptions are still valid and, if not, the process flow of the investment-grade debt fee calculation module 24 could be correspondingly modified. That is, for example, if the sub-product no longer becomes a significant fee differentiator for domestic investment-grade debt offerings, and instead, a key differentiator becomes the credit rating, the process flow of the investment-grade debt fee calculation module 24 may be modified to sort all investment-grade debt offerings by credit rating. In such an embodiment, the investment-grade debt fee calculation module 24 may still utilize different fee look up tables based on region if such a distinction is determined to be appropriate. Similarly, if the credit rating no longer was a significant fee differentiator for an international investment-grade debt offering, and instead the key differentiator became the sub-product, the process flow of the investment-grade debt fee calculation module 24 may be modified to sort all investment-grade debt offerings by sub-product.

In addition, according to various embodiments, if analysis showed that both the sub-product and the credit rating were significant factors, the investment-grade debt fee calculation module 24 may use, for example, different look-up tables based on various combinations of sub-product and credit rating. Further, in the above example, only two regions were considered: domestic and international. In other embodiments, differing regions could be utilized, such as, for example, North America, Europe, Latin America, Asia, etc. The investment-grade debt fee calculation module 24 may estimate the book running fees in such embodiments using, for example, only those factors (e.g., sub-product and/or credit rating) that are significant to the fee in the respective regions.

Figures 11, 12, 13:
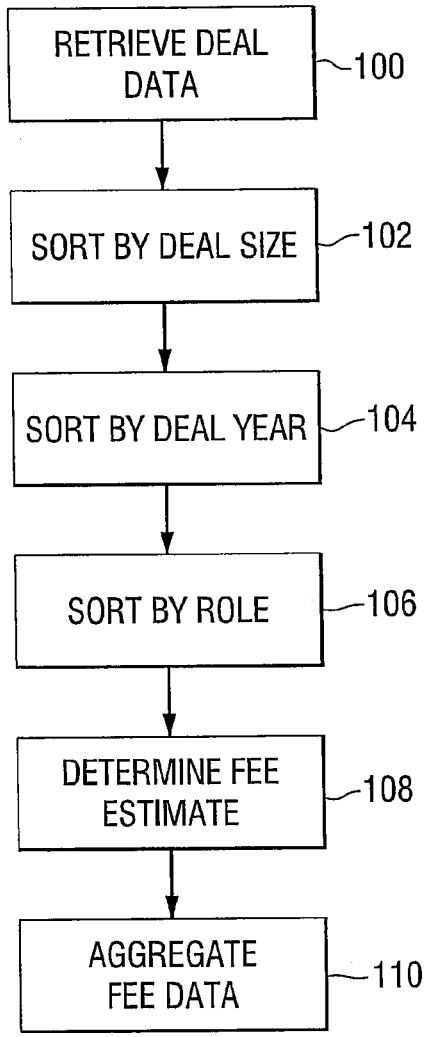
FIG. 11 is a flowchart of a process flow through the high yield fee calculation module of the system of FIG. 1 according to various embodiments of the present invention.
FIGS. 12 and 13 are sample fee look-up tables for the high yield fee calculation module.

FIG. 11 is a flowchart of the process flow through the high yield fee calculation module 26 according to various embodiments. The process commences at step 100, where the data regarding offerings of high-yield securities (e.g., stocks or bonds) are retrieved from the database 14. At step 102, the data may be sorted by, for example, deal size. The deal size groupings, or buckets, may be, for example, as follows:

| | |
|---|---|
| Large | >$1 B |
| Medium | $250 M-$1 B |
| Small | <$250 M |

Next, at step 104, the data may be sorted by deal year. Next, at step 106, the data may be sorted by the role of the advisor in the syndicate, e.g., book runner and non-book runner. At step 108, the high yield fee calculation module 26 may determine the fee estimates based on, for example, look-up tables based on the role of the advisor. FIGS. 12 and 13 are sample look-up tables. FIG. 12 is a sample look-up table for the fee estimate for book runners and FIG. 13 is a sample look-up table for the fee estimate for non-book runners. Returning to FIG. 11, at step 110, the high yield fee calculation module 26 may aggregate the fee estimation data in order that it may be analyzed, as described above.

In the exemplary fee look-up tables of FIGS. 3, 6, 9, 10, 12 and 13, the values of the tables are populated with percentages based on past experience. Further, as mentioned above, the percentages may be linearized such that the estimated fee is a monotone function. According to other embodiments, the values of the tables may comprise, for example, equations or numerical models, rather than absolute percentages, that yield the fee percentage. The equations and/or models may be generated based on, for example, a regression analysis that generates the values of parameters for the equation/model to cause the equation/model to best fit a set of data observations based on past relevant deals.

The wallet share determination module 28 may track, for example, wallet share information for the advisors/investment banks based on the fee information determined by the modules 20-26. For example, the wallet share determination module 28 may determine a particular advisor/investment bank's wallet share over a particular time period for M&A deals, equity product deals, investment-grade debt deals and high yield deals. In addition, the wallet share determination module 28 may perform comparisons of the wallet share of different advisors/investment banks for any group of clients, for example, a sector, a country or a region.

Figure 14:
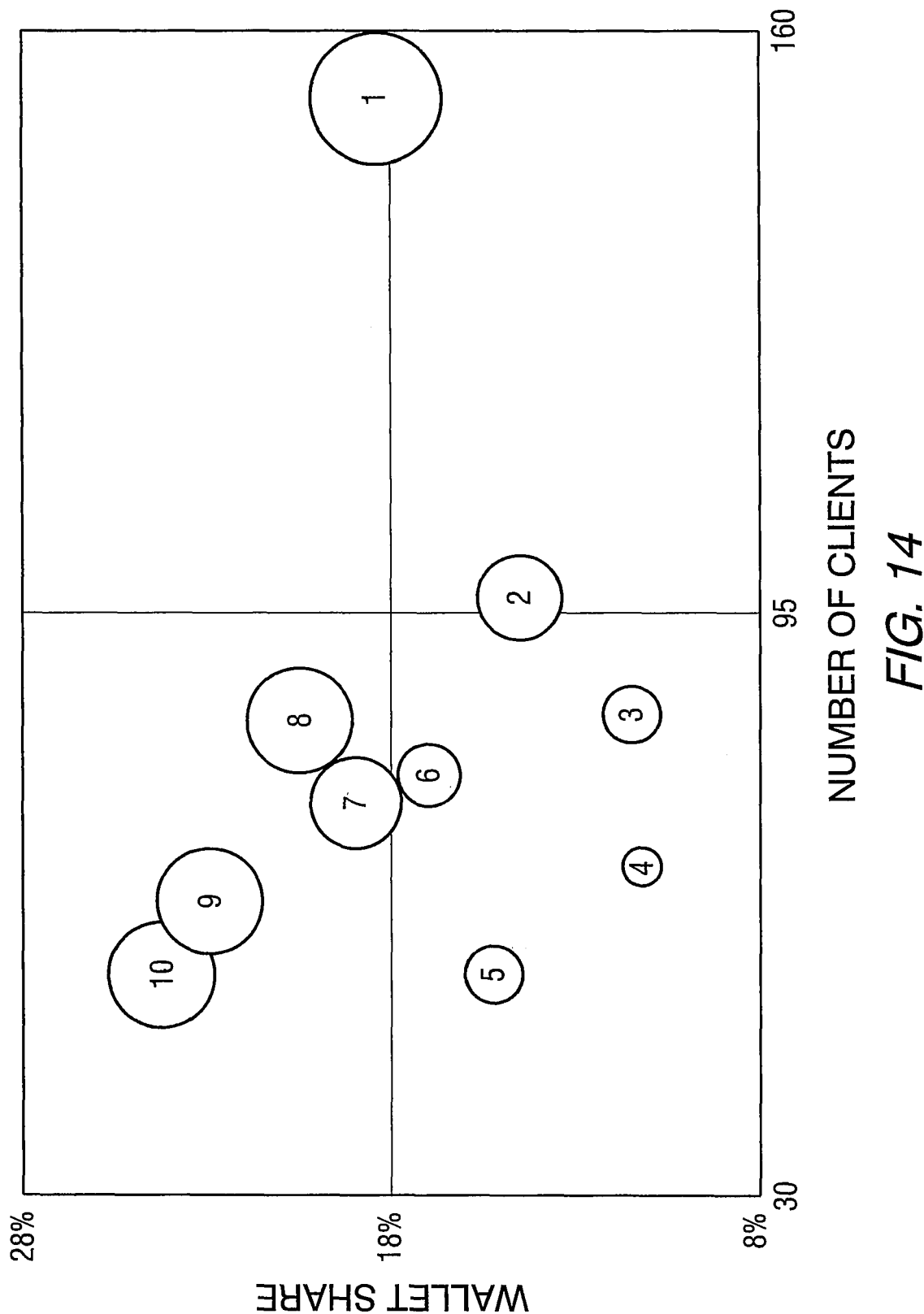
FIG. 14 is a diagram of a two-dimensional grid for displaying market trend information according to various embodiments of the present invention.

According to various embodiments, the wallet share determination module 28 may generate a graphical display such as shown in FIG. 14 to illustrate a comparison between the wallet shares of investment banks for such types of deals. The wallet share information may span a specific time period input by the user. The display generated by the wallet share determination module 28 may be displayed on one of the output devices, for example. As can be seen in FIG. 14, the display may include a two-dimensional grid. One axis of the grid (e.g., the x-axis) may correspond to the "footprint" for the advisor/investment bank, i.e., the number of different clients serviced by the advisor/investment bank. A second axis (e.g., the y-axis) may correspond to the wallet share for the respective client base. A marker having a geometric shape, such as a circle, may be placed at the coordinate of the grid where the footprint of a particular advisor/investment bank meets the wallet share percentage for that particular advisor/investment bank. Further, a parameter, such as size, of the marker (such as the radius of a circle) may be indicative or otherwise related to the size of the wallet for the particular investment bank.

For instance, with reference to the example of FIG. 14, investment bank #1 serviced approximately 150 clients and earned a wallet share of approximately 18% from those clients. In contrast, investment bank #2 serviced approximately 100 clients and earned a wallet share of approximately 16% from those clients. Also, as can be seen from FIG. 14, the wallet size for investment bank #1 is larger (approximately 60% larger) than the wallet share for investment bank #2 because the geometric shape for investment bank #1 is correspondingly larger than the geometric shape for investment bank #2.

While several embodiments of the invention have been described, it should be apparent, however, that various modifications, alterations and adaptations to those embodiments may occur to persons skilled in the art with the attainment of some or all of the advantages of the present invention. For example, the steps described above in connection with process flows of the various modules may be performed in various orders. It is therefore intended to cover all such modifications, alterations and adaptations without departing from the scope and spirit of the present invention as defined by the appended claims.

What is claimed is:

1. A method of estimating a wallet share for one or more advisors for investment banking deals involving equity-related products that occurred during an evaluation time period, the method comprising:
    storing, in a database of a computer system, data regarding the deals involving equity-related products during the evaluation time period, wherein the data includes an identification of the one or more advisors for each of the deals involving equity-related products during the evaluation time period, a role of the one or more advisors in the deals involving equity-related products during the evaluation time period, and a plurality of parameters for the deals involving equity-related products, wherein the plurality of parameters comprise:
        a type of equity-related product;
        a geographic region for the deal;
        a deal size for the deal;
    determining, by the computer system, a fee estimate for the one or more advisors for the deals involving equity-related products during the evaluation time period, wherein the fee estimate for the one or more advisors for each deal is determined based on one or more look-up tables specific to the type of equity-related product and the geographic region for the deal, and wherein the one or more look-up tables indicate a fee estimate for the one or more advisors based on the deal size, the number of advisors, and the role of the one or more advisors; and
    determining, by the computer system, a wallet share for the one or more advisors over the evaluation time period based on an aggregation of the fee estimates for the one or more advisors during the evaluation time period,
    wherein the computer system comprises a processor and a computer-readable medium that stores instructions that are executed by the processor.

2. The method of claim 1, wherein the fee estimates of the one or more look-up tables includes fee percentages.

3. The method of claim 2, wherein the fee percentages of the one or more look-up tables are a monotone function of the deal size.

4. The method of claim 1, wherein the fee estimates of the one or more look-up tables includes numerical models.

5. The method of claim 1, wherein roles for the advisors for the deals involving equity related products comprise a book runner, lead manager, co-lead manager, and co-manager.

6. The method of claim 5, wherein one or more look-up tables comprises:
    a first look-up table that indicates a fee estimate that is to be shared by the one or more advisors on a deal; and
    a second look-up table that indicates an allocation of the fee estimate that is to be shared by the one or more advisors on the deal based the role of the advisor.

7. The method of claim 1, wherein the deals involving equity-related products comprise initial public offerings, offerings of convertible securities, secondary offerings, and block trades of securities.

8. A computer system for estimating a wallet share for one or more advisors for investment banking deals involving equity-related products that occurred during an evaluation time period, the computer system comprising:
    a database that stores data regarding the deals involving equity-related products during the evaluation time period, wherein the data includes an identification of the one or more advisors for each of the deals involving equity-related products during the evaluation time period, a role of the one or more advisors in the deals involving equity-related products during the evaluation time period, and a plurality of parameters for the deals involving equity-related products, wherein the plurality of parameters comprise:
a type of equity-related product;
a geographic region for the deal;
a deal size for the deal;
a processor in communication with the database; and
a memory in communication with the processor, wherein the memory stores instructions that when executed by the processor cause the processor to estimate the wallet share for the one or more advisors by:
determining a fee estimate for the one or more advisors for the deals involving equity-related products during the evaluation time period, wherein the fee estimate for the one or more advisors for each deal is determined based on one or more look-up tables specific to the type of equity-related product and the geographic region for the deal, and wherein the one or more look-up tables indicate a fee estimate for the one or more advisors based on the deal size, the number of advisors, and the role of the one or more advisors; and
determining a wallet share for the one or more advisors over the evaluation time period based on an aggregation of the fee estimates for the one or more advisors during the evaluation time period.

9. The computer system of claim 8, wherein the fee estimates of the one or more look-up tables includes fee percentages.

10. The computer system of claim 9, wherein the fee percentages of the one or more look-up tables are a monotone function of the deal size.

11. The computer system of claim 8, wherein the fee estimates of the one or more look-up tables includes numerical models.

12. The computer system of claim 8, wherein the deals involving equity-related products comprise initial public offerings, offerings of convertible securities, secondary offerings, and block trades of securities.

13. The computer system of claim 8, wherein roles for the advisors for the deals involving equity related products comprise a book runner, lead manager, co-lead manager, and co-manager.

14. The computer system of claim 13, wherein one or more look-up tables comprises:
a first look-up table that indicates a fee estimate that is to be shared by the one or more advisors on a deal; and
a second look-up table that indicates an allocation of the fee estimate that is to be shared by the one or more advisors on the deal based the role of the advisor.

* * * * *